United States Patent [19]  
Althaus et al.

[11] Patent Number: 4,902,091  
[45] Date of Patent: Feb. 20, 1990

[54] LIGHT WAVEGUIDE FEEDTHROUGH FOR OPTOELECTRONIC MODULES AND METHOD FOR THEIR MANUFACTURE

[75] Inventors: Hans-Ludwig Althaus, Lappersdorf; Joachim Bialas, Deisenhofen; Helmut Haltenorth, Munich; Ewald Hoermann, Holzkirchen; Evelyn Keil; Edmund Sobota, both of Munich, all of Fed. Rep. of Germany

[73] Assignee: Siemens AG, Berlin and Munich, Fed. Rep. of Germany

[21] Appl. No.: 330,328

[22] Filed: Mar. 29, 1989

[30] Foreign Application Priority Data

Mar. 31, 1988 [DE] Fed. Rep. of Germany ....... 3811033

[51] Int. Cl.$^4$ .............................................. G02B 6/36
[52] U.S. Cl. ............................................... 350/96.20
[58] Field of Search ............... 350/96.18, 96.20, 96.15, 350/96.17, 96.20; 250/227, 552; 357/17, 19, 30, 74, 80

[56] References Cited

U.S. PATENT DOCUMENTS

| | | | |
|---|---|---|---|
| 3,371,413 | 3/1968 | Rundle | 29/629 |
| 4,119,363 | 10/1978 | Camlibel et al. | 350/96.20 |
| 4,362,356 | 12/1982 | Williams et al. | 350/96.20 |
| 4,822,130 | 4/1989 | Maranto et al. | 350/96.20 |
| 4,826,276 | 5/1989 | Abbott et al. | 350/96.20 |

FOREIGN PATENT DOCUMENTS

| | | |
|---|---|---|
| 1108900 | 9/1978 | Canada . |
| 3440437 | 5/1986 | Fed. Rep. of Germany . |
| 3445982 | 6/1986 | Fed. Rep. of Germany . |
| 3533920 | 3/1987 | Fed. Rep. of Germany . |
| 3606588 | 9/1987 | Fed. Rep. of Germany . |
| 2127990 | 4/1984 | United Kingdom ............. 350/96.15 |

OTHER PUBLICATIONS

International Publication Number: WO86/06472 (International Application Published Under the Patent Cooperation Treaty (PCT) Mackenzie, International Publication Date: 6 Nov. 1986 (06/11/1986).

Primary Examiner—John D. Lee  
Assistant Examiner—Phan T. Heartney  
Attorney, Agent, or Firm—John Francis Moran

[57] ABSTRACT

With a light waveguide feedthrough for optoelectronic modules a light waveguide fiber (1) is guided hermetically tight and mechanically stable, in particular long-term stable, directly through a module housing wall. The light waveguide fiber (1) is compression glazed in the housing-side front portion of a relatively thick-walled metal tubule (2) without external coating (5) and affixed by adhesion in its rear portion. An application of the light waveguide feedthrough according to the invention is in optoelectronic transducer modules.

9 Claims, 2 Drawing Sheets

FIG 1
FIG 2
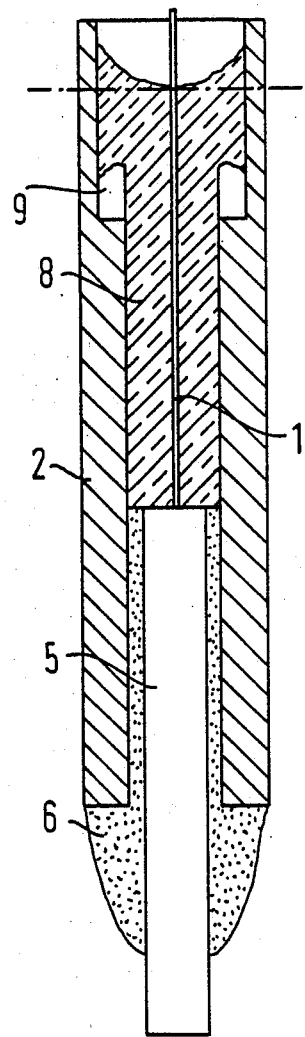
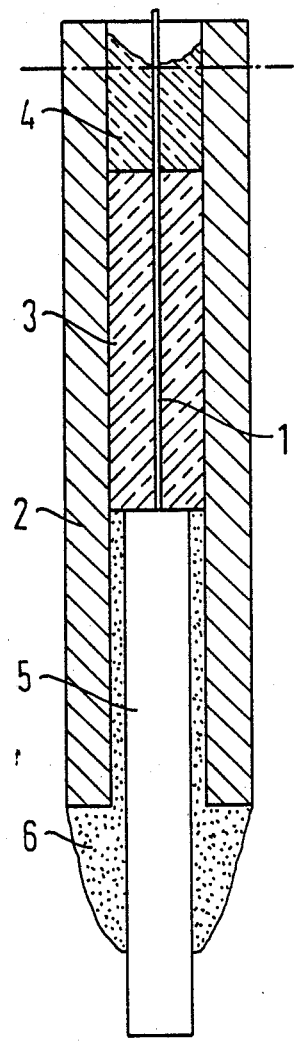

LIGHT WAVEGUIDE FEEDTHROUGH FOR OPTOELECTRONIC MODULES AND METHOD FOR THEIR MANUFACTURE

BACKGROUND OF THE INVENTION

The present invention relates to a light waveguide feedthrough for optoelectronic modules in which a light waveguide fiber is guided hermetically sealed through a metal tubule which is fastened in an opening in the module housing wall and a method for the manufacture of light waveguide feedthroughs.

Electro-optical transducer modules for optical information technology must also have optical feedthroughs apart from electrical ones.

In particular for reasons of cost no optical plug is to be used but rather the light waveguide fiber is to be guided directly through the housing wall, and especially in the form of a connecting fiber (pigtail). This feedthrough must be hermetically sealed and mechanically stable. Due to these stated requirements, the use of adhesion is eliminated.

Heretofore several light waveguide feedthroughs or method for their manufacture were developed and to some extent also commercially applied:

Thus a hermetically sealed light waveguide fiber feedthrough through a housing wall is already known in which the light waveguide fiber is enclosed in a metal tubule which is fixed in a bore in the housing wall. The metal tubule consists herein of a material with lower melting point and higher coefficient of expansion than the light waveguide fiber and is at least in one place fused onto the light waveguide fiber. For example, see German patent document DE-OS 34 40 437.

In addition it is known to glaze the light waveguide fiber into a thin-walled metal tubule, which is soldered in a flange and welded onto the housing.

Furthermore, a glass fiber for an optic line of the information technology is known in which, so as to improve the solderability, the mechanical strength, and, in particular the optical quality, the glass fiber surface from the inside to the outside is provided with a sequence of titanium, palladium, and gold coating as disclosed in German patent document DE-OS 34 45 982.

Further, a gas-tight feedthrough of a glass fiber through the wall of a gas-tight housing of an optoelectronic module is known in which a hole of the wall is closed gas-tight through a stopper of a vacuum-tight elastic material which was inserted through pressing together under compressive strain, and in the stopper a straight-line channel enclosing the glass fiber tightly under compressive strain is applied from the housing exterior to the housing interior as disclosed in German patent document DE-PS 36 06 588.

These conventional light waveguide feedthroughs are, however, relatively complex and not hermetically tight, in particular not sufficiently mechanically stable in order to ensure the requisite impermeability over extensive periods of time.

SUMMARY OF THE INVENTION

An object of the invention is to provide a light waveguide feedthrough of the foregoing type as well as a method for its manufacture which not only does not require great complexity and is cost-efficient but also permits a hermetically tight and mechanically very stable light waveguide feedthrough which ensures in particular high long-term stability even under disturbing external influences.

The invention takes the form of a light waveguide feedthrough for aperture in a wall of an optoelectronic module. The feedthrough provides a hermetic seal by featuring a metal tubule secured in the aperture enclosing the light waveguide fiber while providing a compressional glazed portion of the bare or naked fiber in a frontal portion of the metal tubule having relatively thick walls while the rear portion around the fiber including an outer coating by adhesive material affixed therein.

In some of the further aspects of the invention, the compressional fit around the glazing of the bare fiber utilizes a glass solder capillary. The coefficient of thermal expansion for the metal tubule is higher than that of the fusing glass and the material of the fiber. Also, a glass solder ring may be used to seal of the glass capillary.

A method for producing utilizes a sequence of steps which ensure the seal of the compressional fit by heating and subsequent cooling renders the feedthrough hermetically sealed. A vacuum is pulled on the module to affix the adhesive agent and then surface grinding and polishing are used to finish off its end face.

For such light waveguide feedthroughs, it is important that the metal tubule which is relatively thick-walled comprises a material whose coefficient of thermal expansion is greater than that of the fusing glass and of the material of the light waveguide fiber.

Among the advantages achieved according to the invention includes, in particular, the light waveguide feedthrough relies on the principle of the compression glass feedthrough of the light waveguide fiber through a relatively thick-walled metal tubule. Such a feedthrough provides superior through temperature loading capacity and thermal shock resistance, mechanical stability, vacuum tightness, and good heat dissipation.

The light waveguide fiber is glazed in only in the front portion of the metal tubule, i.e. in the housing-side portion, in order to make the feedthrough hermetically tight and long-term stable. In the rear portion of the metal tubule, the light waveguide fiber is affixed by adhesion in order to achieve strain relief.

In addition, heat-shrinkable tubing is advantageously applied as antikinking protection for the light waveguide fiber.

After completion the metal tubule is provided with a flange and welded to the opening in the module housing. The compression glass feedthrough together with the relatively thick-walled tubule ensures high mechanical stability of the feedthrough. The flange functions, additionally, for adjusting the arrangement.

BRIEF DESCRIPTION OF THE DRAWING

Features of the invention and additional objects of the invention will be more readily appreciated and better understood by reference to the following detailed description which should be considered in conjunction with the drawing.

FIG. 1 illustrates a sectional view of a light waveguide feedthrough in accordance with the invention.

FIG. 2 provides a sectional view of another light waveguide feedthrough according to the invention.

DETAILED DESCRIPTION

Figure 3:
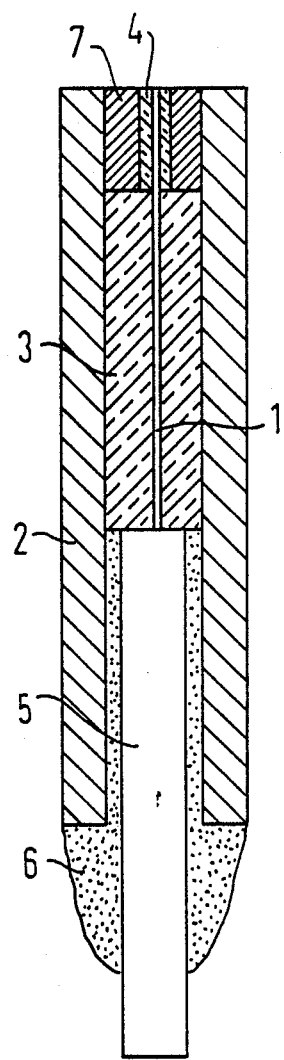
FIG. 3 depicts a further light waveguide feedthrough in accordance with the principles of the invention.

The light waveguide feedthroughs depicted in FIGS. 1 and 2 include a light waveguide fiber 1 which is compression glazed into the housing-side front portion of a relatively thick-walled metal tubule 2 without external coating that is plain or bare and affixed by adhesion into its rear portion. To maintain the principle of the compression glass feedthrough, care must be taken in the selection of the material for the metal tubule, the fusing glass, and the fiber so that the metal tubule 2 is constructed of a material whose coefficient of thermal expansion is significantly higher than that of the fusing glass and of the material of the light waveguide fiber 1. Suitable material for metal tubule 2 are a nickel-iron or nickel-iron-cobalt-containing fusing alloy.

The method of manufacture is the same for both implementations. The light waveguide fiber 1 (here in fixed-lead implementation) is placed in the glass solder capillary 8 (FIG. 1) or in the glass capillary 3 and the glass solder ring 4 (FIG. 2). The capillaries 3, 8 are previously placed into a suitable etching agent in order to eliminate all sharp edges which could damage the stripped light waveguide fiber 1 through slitting it slightly. Over the glass solder capillary 8 (FIG. 1) and the light waveguide fiber 1, or over the glass capillary 3, the glass solder ring 4, and the light waveguide fiber 1 (FIG. 2), the metal tubule 2 is placed. The upper portion of this, that is the housing-side front portion, is heated to the melting temperature of the glass solder and the lower portion, that is the rear portion, is cooled in order to protect the coating 5 of the light waveguide fiber 1 against burning. After the melt is solidified, it is under radial compression strain because the thermal expansion coefficient of the metal is greater than that of the glass solder. The inner cross section expansion 9, that is the widening of the metal tubule 2 on the inside in the illustrative embodiment depicted in FIG. 1, prevents tension ruptures at the transition glass solder capillarymelt. In the arrangement shown in FIG. 2, this is not necessary because the glass capillary 3 due to higher melting temperature is not fused on.

In the illustrative embodiment shown in FIG. 3, the glazing cross section is restricted to a minimum and permits compressive glazing as well as also a fitted glazing. To this end, a metal tubule 7 of suitable material is hermetically tightly welded or soldered into the end of the housing-side front portion of the metal tubule 2 so that a cross sectional constriction is formed. Into this cross sectional constriction, the glass solder ring 4 is then glazed in. Further implementation then corresponds to that example described in particular in connection with FIG. 2. This implementation has the advantage that the material of the glass solder ring 4 is nearly independent of the material properties of the metal tubule 2 due to the additional metal tubule 7.

After glazing in the light waveguide feedthrough is placed into a receiver and affixed by adhesion in a vacuum. This ensures that all hollow spaces are filled out by the adhesive agent 6.

After the adhesive agent 6 has solidified, the glazing is surface-ground at the level of the dot-dash line (FIGS. 1 and 2) and polished in order to achieve faultless optical transmission.

The finished glazing can advantageously be provided at the rear end with a (not shown) heat-shrinkable tubing as protection against kinking.

There has thus been shown and described a novel light waveguide feedthrough and its method of manufacture which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

What is claimed is:

1. A hermetic light waveguide feedthrough for an optoelectrponic module for passing a light waveguide fiber including a general coextensive outer coating tightly through a metal tubule in an opening in a housing wall of the module, the feedthrough comprising a relatively thick-walled elongated metal tubule having an axis coextensive with the light waveguide fiber, the light waveguide fiber is affixed by adhesion in a rear portion of the metal tubule and enclosed by a glass glazing in a front portion of the metal tubule, the elongated metal tubule having a relatively high coefficient of thermal expansion compared to the glass glazing so as to produce a compressional force thereon for providing a hermetic seal and a mechanically rigid feedthrough.

2. A light waveguide feedthrough according to claim 1, wherein the bare light waveguide fiber is compression glazed into the front portion of the metal tubule by means of a glass solder capillary and that the end of the front portion of the metal tubule has an inner cross sectional widening.

3. A light waveguide feedthrough according to claim 1, wherein the metal tubule comprises of a material whose coefficient of thermal expansion is higher than that of the fusing glass and of the material of the light waveguide fiber.

4. A light waveguide feedthrough according to claim 1, wherein the metal tubule comprises an Ni-Fe-containing fusing alloy.

5. A light waveguide feedthrough according to claim 1, wherein the metal tubule comprises an Ni-Fe-Co-containing fusing alloy.

6. A light waveguide feedthrough according to claim 1, wherein the light waveguide fiber provided with a coating is embedded in an adhesive agent in the rear portion of the metal tubule.

7. A light waveguide feedthrough according to claim 1, wherein the outer portion of the light waveguide fiber has a coating provided with a heat-shrinkable tubing which also encloses the rear portion of the metal tubule.

8. A light waveguide feedthrough according to claim 1, wherein the bare light waveguide fiber is compression glazed into the front portion of the metal tubule by means of a glass capillary which is closed off toward the outside by a glass solder ring.

9. A light waveguide feedthrough according to claim 8, wherein a metal tubule of suitable material is hermetically tightly fastened in the end of the front portion of the metal tubule so that in the region of the glass solder ring a cross sectional constriction is formed.

* * * * *

UNITED STATES PATENT AND TRADEMARK OFFICE
CERTIFICATE OF CORRECTION

PATENT NO. : 4,902,091
DATED : Feb. 20, 1990
INVENTOR(S) : Althaus et al.

It is certified that error appears in the above-identified patent and that said Letters Patent is hereby corrected as shown below:

Cover Page
Section [75] delete "Evelyn Keil" and insert in its place --Rudolf Keil (deceased)--.

Signed and Sealed this

Tenth Day of September, 1991

Attest:

HARRY F. MANBECK, JR.

Attesting Officer

Commissioner of Patents and Trademarks